(12) United States Patent
DeLaPaz

(10) Patent No.: US 11,131,904 B2
(45) Date of Patent: Sep. 28, 2021

(54) PHOTOGRAPHIC LIGHT GENERATING PANEL

(71) Applicant: Xavier DeLaPaz, Fort Worth, TX (US)

(72) Inventor: Xavier DeLaPaz, Fort Worth, TX (US)

( * ) Notice: Subject to any disclaimer, the term of this patent is extended or adjusted under 35 U.S.C. 154(b) by 0 days.

(21) Appl. No.: 17/032,079

(22) Filed: Sep. 25, 2020

(65) Prior Publication Data

US 2021/0116789 A1 Apr. 22, 2021

Related U.S. Application Data

(60) Provisional application No. 62/915,770, filed on Oct. 16, 2019.

(51) Int. Cl.
*G03B 15/06* (2021.01)
*G03B 15/05* (2021.01)

(52) U.S. Cl.
CPC ............ *G03B 15/06* (2013.01); *G03B 15/05* (2013.01); *G03B 2215/0567* (2013.01); *G03B 2215/0585* (2013.01); *G03B 2215/0589* (2013.01)

(58) Field of Classification Search
CPC ................................ G03B 15/06; G03B 15/05; G03B 2215/0567; G03B 2215/0585; G03B 2215/0589; G03B 15/07
See application file for complete search history.

(56) References Cited

U.S. PATENT DOCUMENTS

| | | | | |
|---|---|---|---|---|
| 6,454,437 B1 * | 9/2002 | Kelly | ........................ | G01J 3/10 359/287 |
| 7,290,893 B2 * | 11/2007 | Amphlett | ............... | G03B 15/03 362/11 |
| 7,712,907 B2 | 5/2010 | Zyka | | |
| 10,558,107 B2 | 2/2020 | Lin | | |
| 2004/0212996 A1 * | 10/2004 | Burckhardt | ............ | G03B 15/05 362/249.01 |
| 2014/0270964 A1 * | 9/2014 | Mund | ..................... | E04H 4/108 405/52 |
| 2016/0230942 A1 * | 8/2016 | Hudson | ..................... | F21K 9/20 |

OTHER PUBLICATIONS

Savage; Hands on with the Savage Luminous Pro 19-in Ring Light; Scotty Myers; Parkwood Studios; video published via YouTube.com on Dec. 27, 2017; https://www.youtube.com/watch?v=tCFN9pgAy70.
Interfit; How to Use a 5-in-1 Photo Reflector; Steven; video published via YouTube.com on Dec. 12, 2018; https://www.youtube.com/watch?v=oNSECPuhQ3g.

* cited by examiner

*Primary Examiner* — Evan P Dzierzynski
(74) *Attorney, Agent, or Firm* — bobharter.com; Robert J. Harter

(57) ABSTRACT

A photographic light generating panel includes, in some examples, front and rear support rings that are selectively foldable from an open position with a circular shape to a coiled position in which the front and rear support rings are each coiled into two or more loops. The light generating panel also includes a flexible rear panel having an outer edge that is coupled along a periphery of the rear support ring, a flexible front panel having an outer edge that is coupled along a periphery of the front support ring, an optional annular covering fabric layer coupled between the periphery of the front support ring and the periphery of the rear support ring, and multiple light emitting diodes (LEDs) between the front and rear panels. Light from the LEDs reflects off the rear panel toward the front panel, which disperses the light.

20 Claims, 18 Drawing Sheets

FIG. 14
FIG. 15
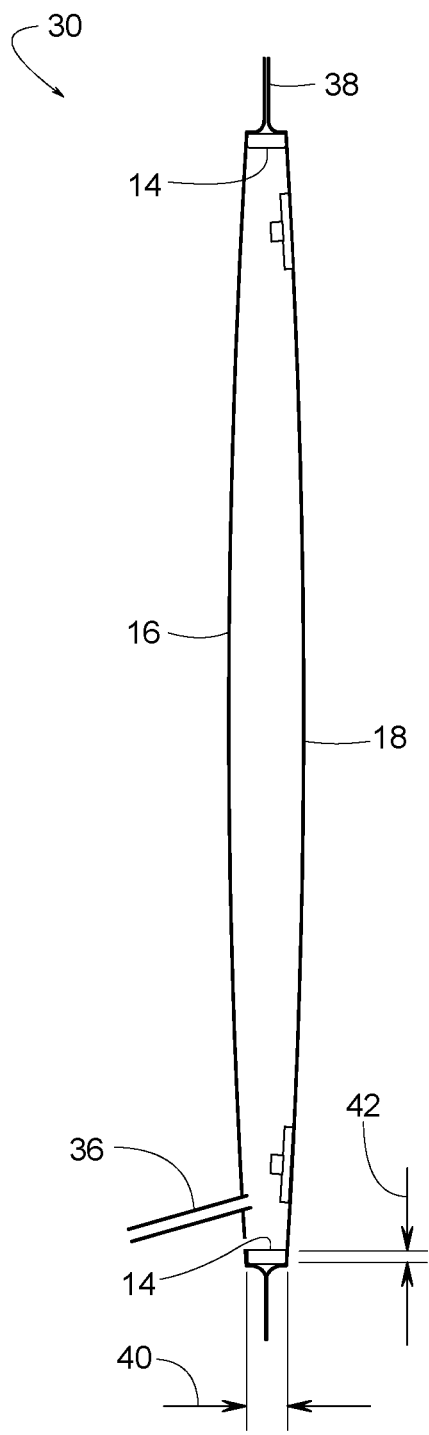
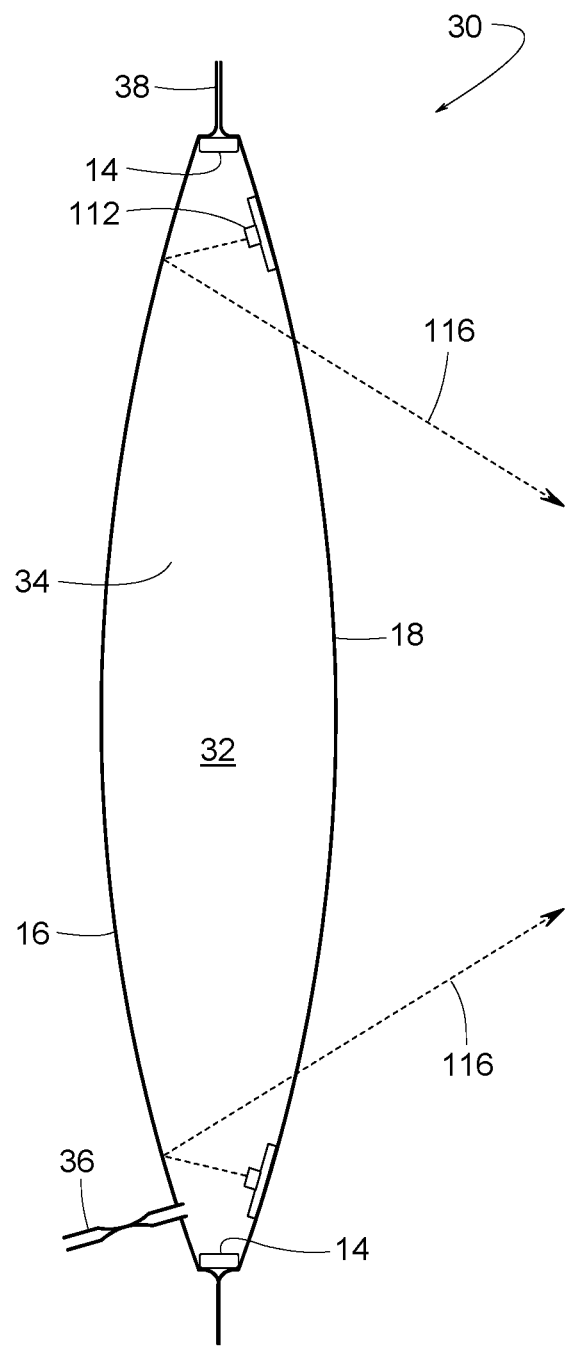

PHOTOGRAPHIC LIGHT GENERATING PANEL

CROSS REFERENCE TO RELATED APPLICATIONS

This present application claims the benefit of provisional patent application Ser. No. 62/915,770 filed on Oct. 16, 2019.

FIELD OF THE DISCLOSURE

This patent generally pertains to photographic systems and more specifically to photographic light generating panels.

BACKGROUND

Still image photographers, cinematographers, videographers, camera operators, and the like, that may be collectively referred to as photographers often use artificial lighting systems for adjusting or otherwise manipulating light cast on scenes and/or subjects (e.g., humans, animals, objects, etc.) positioned in those scenes. It is generally known that lighting can, and often does, effect the overall tone of resulting photographs, and moving visual images (e.g., videos, films, etc.) to a relatively large degree. In many cases, artificial lighting is used to provide an accurate rendition of a subject or scene. In other cases, the brightness, color, and/or direction of artificial lighting may be manipulated to provide a desired effect. For example, artificial lighting may be used to create a low-key lighting effect where a relatively high contrast lighting ratio is achieved, or a high-key lighting effect where lower lighting contrast results in relatively little shadowing effects.

Photographers have traditionally conducted a relatively large portion of their work in studios where lighting can be easily controlled. In such venues, the size and weight of artificial lighting mechanisms are typically not important because once positioned in place, the artificial lighting mechanisms often require little or no re-positioning or movement. Nevertheless, current trends in the photographic industry have migrated towards more remote venues where photographers perform their work away from the studio. For example, many portrait sessions are now conducted on site at various locations where background imagery at these locations may be used to contribute to the overall effect (sentimentality) of the resulting photographs produced therein. As such, currently available artificial lighting mechanisms used by photographers are now being designed to be lightweight and portable due to their inherent need of being packaged and moved between each shooting location.

SUMMARY

According to one aspect, a photographic light generating panel includes front and rear support rings that are selectively foldable from an open position with a circular shape to a coiled position in which the front and rear support rings are each coiled into at least two or more loops. The light generating panel also includes a flexible rear panel having an outer edge that is coupled along a periphery of the rear support ring, a flexible front panel having an outer edge that is coupled along a periphery of the front support ring, an annular covering fabric layer coupled between the periphery of the front support ring and the periphery of the rear support ring; and multiple light emitting diodes (LEDs) coupled along an inner periphery of the annular covering fabric layer. When the front and rear support rings are in the open position, the flexible rear panel, the flexible front panel, and the annular covering fabric layer form a cylindrical cavity for reeving light generated by the LEDs, wherein the received light is reflected from the reflective inner surface and emitted through the translucent material of the flexible front panel.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not drawn to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIGS. 1A through 2B illustrate an example photographic light generating panel according to one embodiment of the present disclosure.

FIG. 1A is a partial side view an example photographic light generating panel according to one embodiment of the present disclosure.

FIG. 2B is a cross-sectional view taken along line 2B-2B of FIG. 1B.

FIG. 14 is a cross-sectional side view similar to FIG. 13 showing another example photographic light generating panel according to one embodiment of the present disclosure, wherein the photographic light generating panel is in a deflated state.

FIG. 15 is a cross-sectional side view similar to FIG. 14 but showing the photographic light generating panel in an inflated state.

DETAILED DESCRIPTION

Figure 1A:
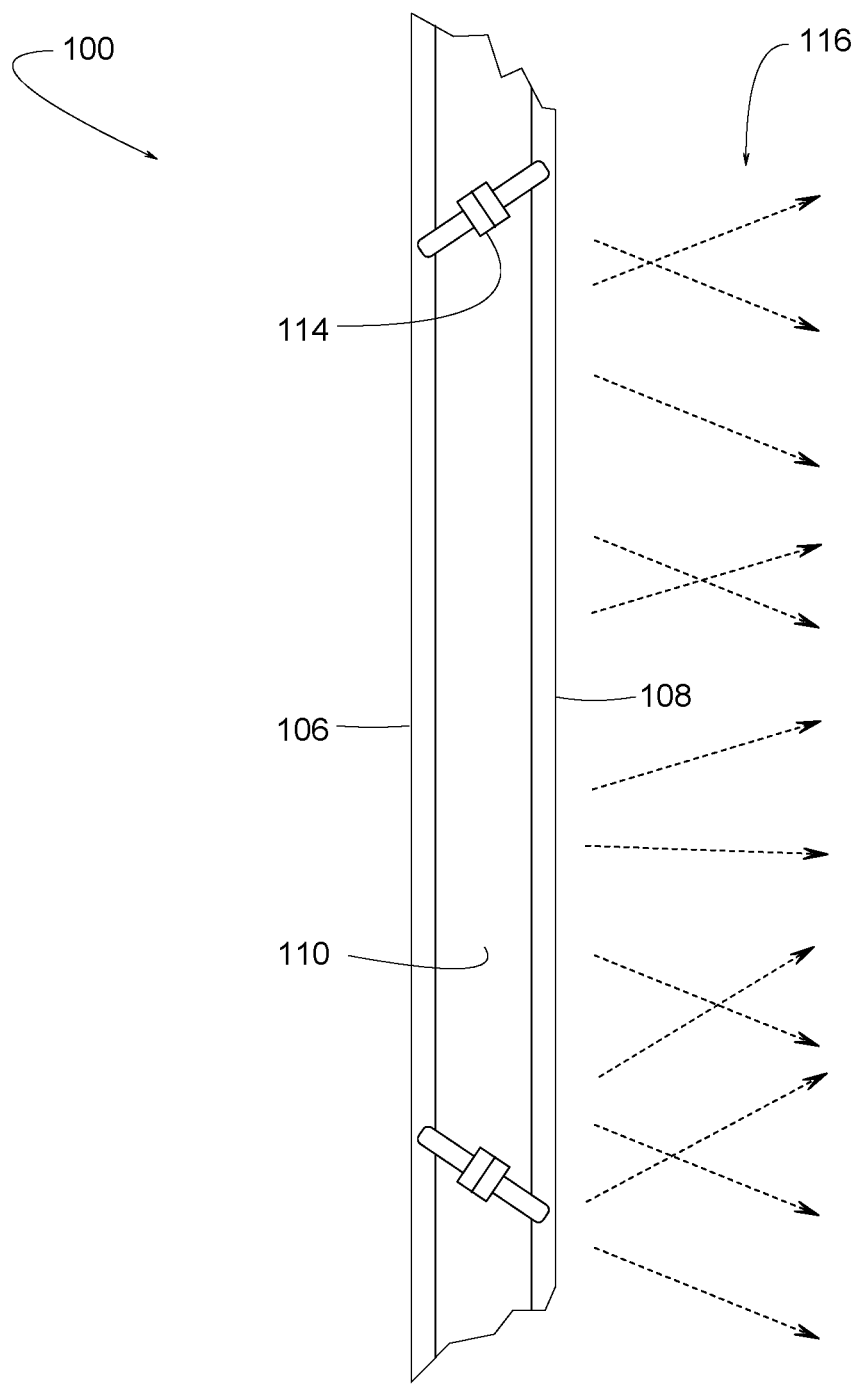

FIGS. 1A through 2B illustrate an example photographic light generating panel 100 according to one embodiment of the present disclosure. The light generating panel 100 includes a front support ring 102, a rear support ring 104, a flexible rear panel 106, a flexible front panel 108, an annular covering fabric layer 110, and multiple light emitting diodes (LEDs) 112 arranged along the inner surface of the annular covering fabric layer 110. The light generating panel 100 also includes struts 114 extending between the front and rear support rings 102, 104 that springably bias the front and rear support rings 102, 104 away from each other so that a cavity is formed between the flexible rear panel 106, the flexible front panel 108, and the annular covering fabric layer 110.

The flexible rear panel 106 has a reflective inner surface 105 while the flexible front panel 108 is formed of a translucent material. The cylindrical cavity receives light generated by the LEDs 112 in a manner such that it is reflected from the reflective inner surface 105 of the flexible rear panel 106, and emitted through the translucent material of the flexible front panel 108 as diffused light 116.

The flexible rear panel 106 may be made of any suitable fabric that is generally flexible and has a reflective inner surface. The flexible front panel 108 may be made of any suitable material, such as fabric, that allows diffused light 116 to pass through its surface. The annular covering fabric layer 110 may be made of any suitable material such as opaque fabric. The flexible rear panel 106, flexible front panel 108, and annular covering fabric layer 110 may be coupled to the front and rear support rings 102, 104 in any suitable manner. In one example, the flexible front panel 108, flexible rear panel 106, and annular covering fabric layer 110 may be attached to the front and rear support rings 102, 104 using standard stitching techniques.

The front and rear support rings 102, 104 are each made of an elongated strip of metal that is attached at its two ends to form a ring. The metal from which the rings are made is tempered so that they it possesses a flexible, spring-like consistency. In general, the front and rear support rings 102, 104 provide a structure for holding the photographic light generating panel 100 in an open position as shown in FIG. 1A. The front and rear support rings 102, 104 may be coiled to selectively fold the light generating panel 100 from the open position having a circular shape (FIG. 1A) to a collapsed position in which the front and rear support rings 102, 104 are each coiled into at least two or more loops.

Figure 10A:
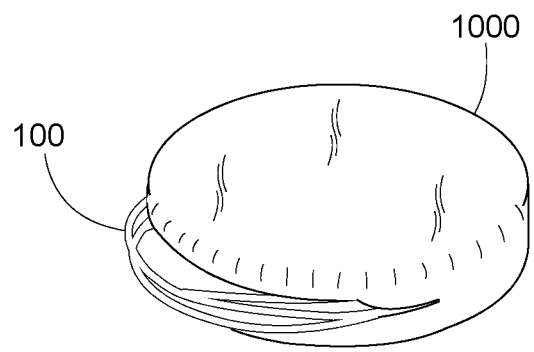
FIG. 10A is a perspective view of the example photographic light generating panel of FIGS. 1A-1C but showing the panel in a triple-loop coiled position and partially inserted in an example pouch constructed in accordance with the teachings disclosed herein.
Figure 10B:
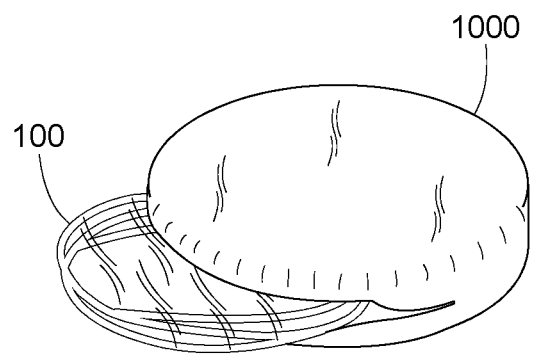
FIG. 10B is another perspective view of the example photographic light generating panel of FIGS. 1A-1C and showing the panel in its triple-loop coiled position and partially inserted in the example pouch shown in FIG. 10A.

FIGS. 10A and 10B illustrate the light generating panel 100 that is in a coiled position and partially enclosed inside of a storage bag 1000.

Figure 1B:
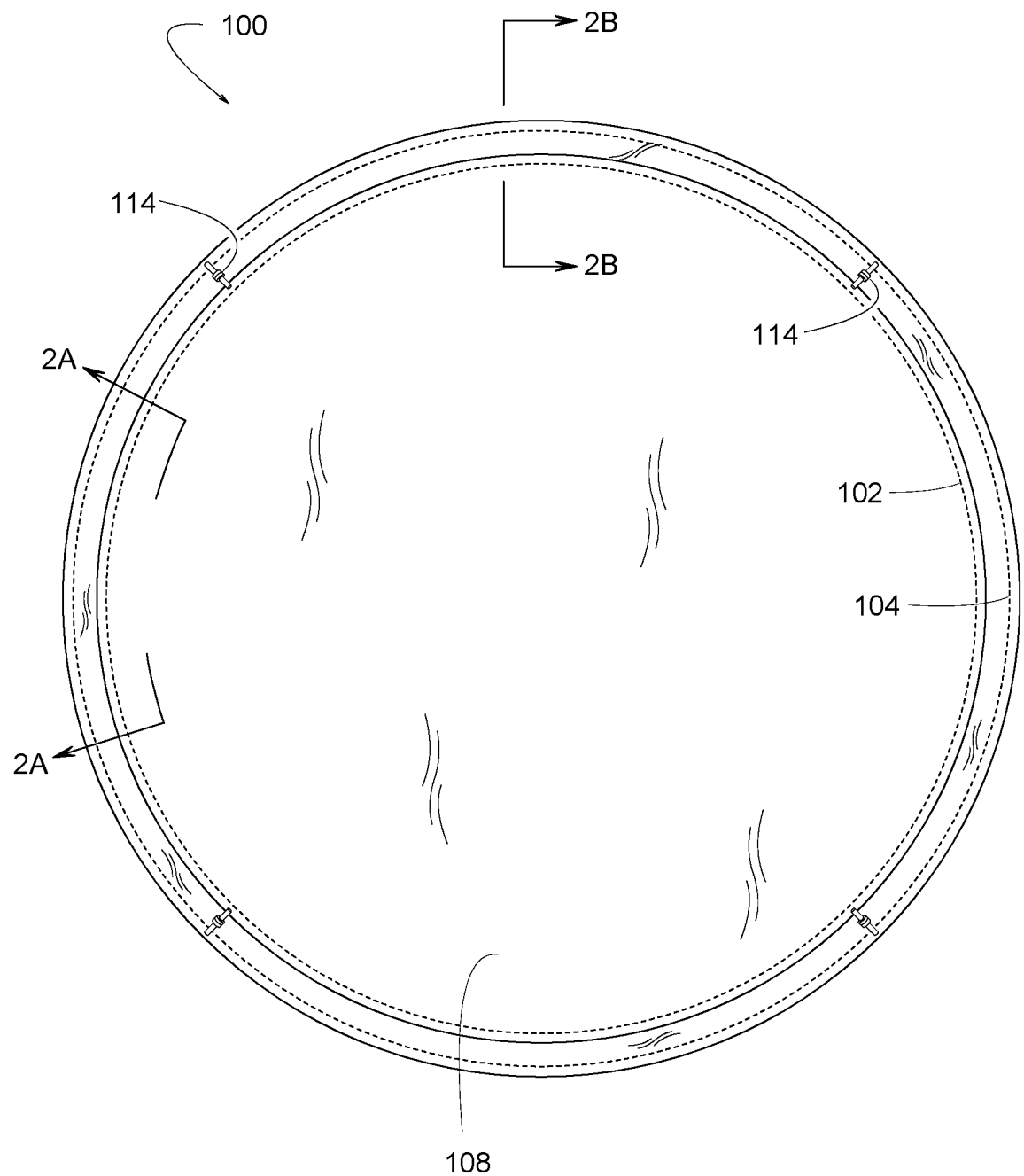
FIG. 1B is a front view of FIG. 1A.
Figure 1C:
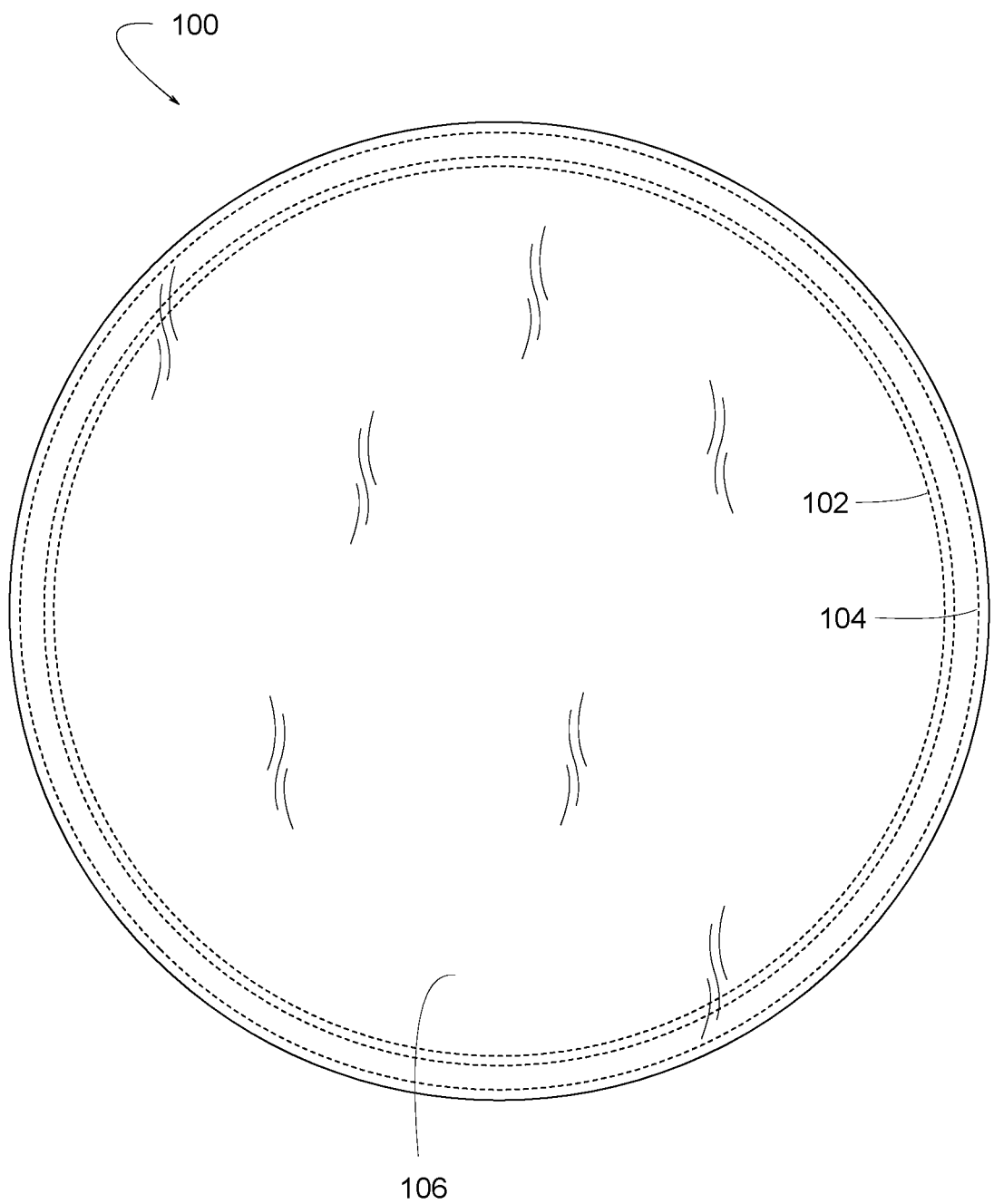
FIG. 1C is a back view of FIG. 1A.
Figure 2A:
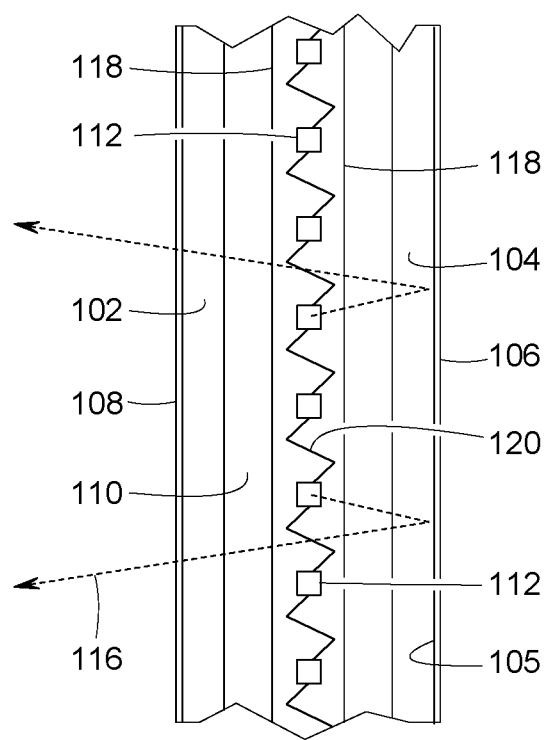
FIG. 2A is a cross-sectional view taken along line 2A-2A of FIG. 1B.
Figure 2B:
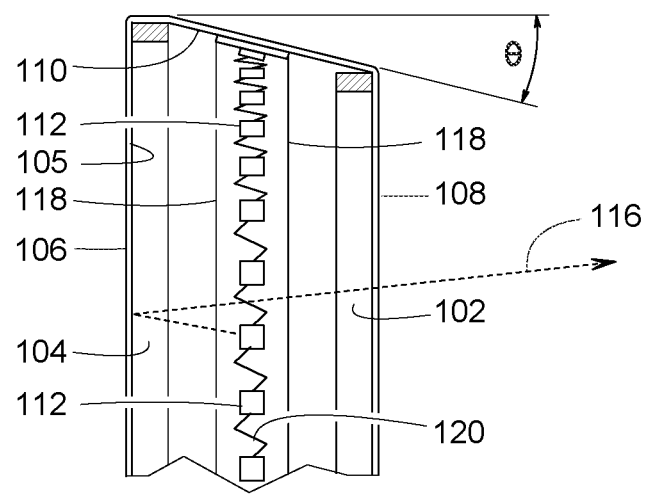

FIG. 2A illustrates a partial cut-away view of the light generating panel 100 taken along the lines 2A-2A of FIG. 1A, while FIG. 2B illustrates a partial cut-away view of the light generating panel 100 taken along the lines 2B-2B of FIG. 1B. As shown, the LEDs 112 are arranged in a regularly-spaced, linear fashion along the inner surface of the annular covering fabric layer 110 via an elongated circuit board 118 that extends along the inner surface of the annular covering fabric layer 110. Electrical power is applied to the LEDs 112 using conductive traces 120 that are routed in a serpentine pattern that allows the circuit board 118 to be bent while mitigating potential breaks in the conductive traces 120. In a particular example, the LEDs 112 and associated circuit board 118 may include a section of LED S Tape, SKU number: LEDC-FS2835-72, which is available from LED Cool Lights located in Dallas, Tex.

As best shown in FIG. 2B, the front support ring 102 has a diameter that is smaller than the diameter of the rear support ring 104 so that the annular covering fabric layer 110 is oriented at an oblique angle (Θ) when the front and rear support rings 102, 104 are in the open position. Thus, when the light generating panel 100 is folded to the coiled position, the front support ring 102 may lie within the periphery of the rear support ring 104 such that the front and rear support rings 102, 104 may be easily coiled, while minimizing its storage volume. Additionally, the oblique angle of the annular covering fabric layer 110 causes the LEDs 112 to be oriented in an oblique angle such that the light from the LEDs 112 is directed towards a reflective surface 105 of the flexible rear panel 106.

Figure 3:
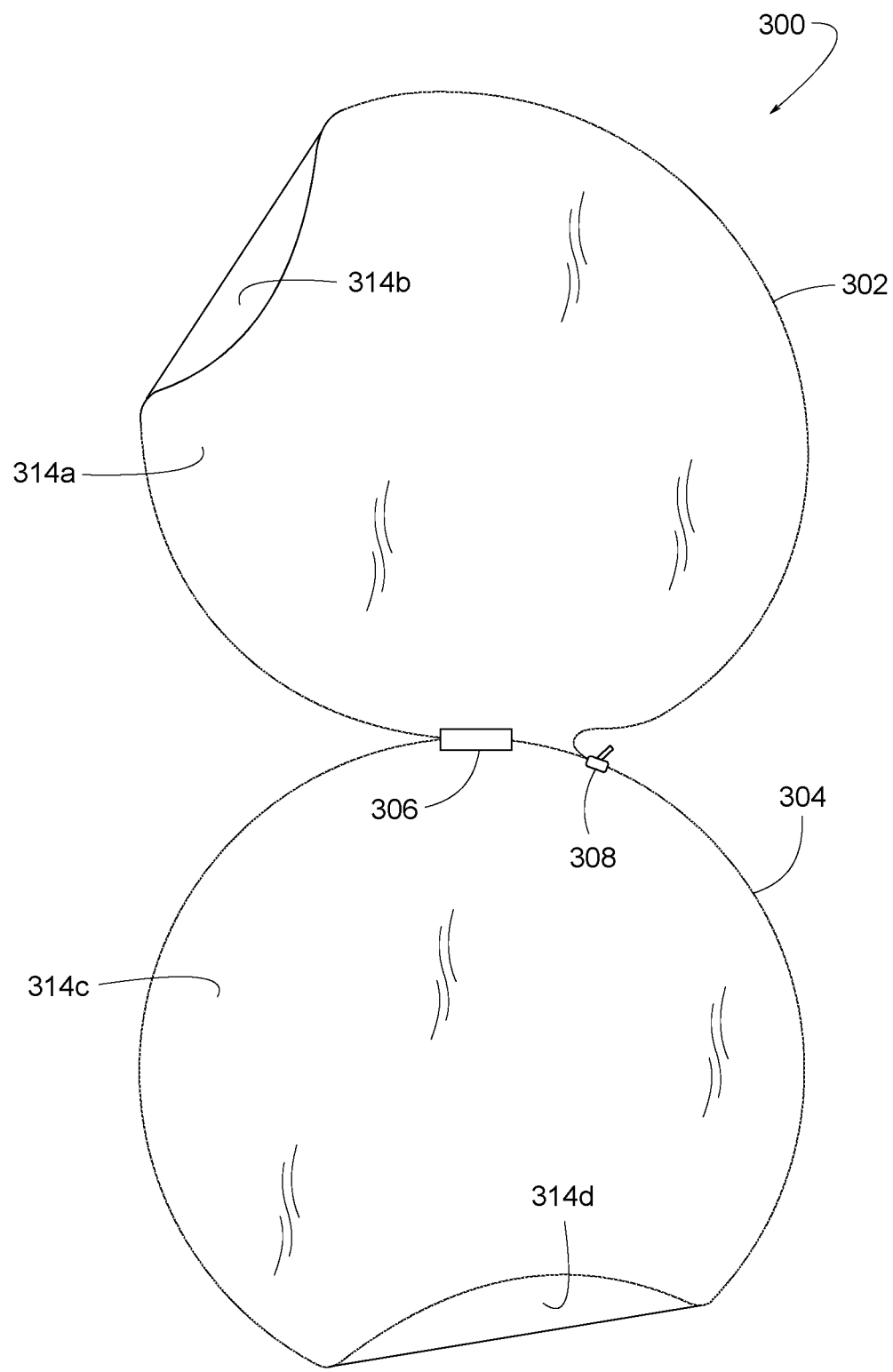
FIG. 3 is a front view of an example selectable color reflecting assembly that may be used with the photographic light generating panel according to one embodiment of the present disclosure.
Figure 4:
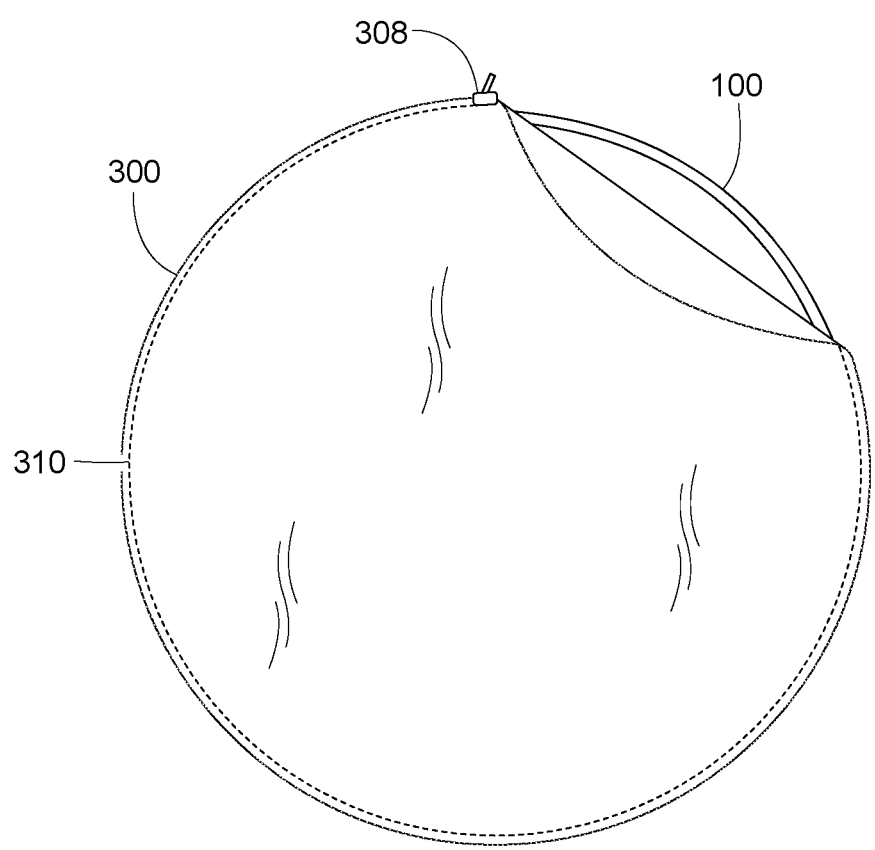
FIG. 4 is a front view of the example selectable color reflecting assembly of FIG. 3 but showing the example photographic light generating panel of FIG. 1B at least partially inserted in the selectable color reflecting assembly.

FIG. 3 illustrates an example selectable color reflecting assembly 300 (a pocket) that may be used with the photographic light generating panel according to one embodiment of the present disclosure. The color reflecting assembly 300 includes a first flexible reflecting panel 302, and a second flexible reflecting panel 304 that are attached together at their edges using one or more relatively short straps 306. A zipper 308 is included that selectively couples the outer periphery of the first and second flexible reflecting panels 302, 304 to one another. When the first and second flexible reflecting panels 302, 304 are coupled together via the zipper 308, a cavity 310 is formed for insertion of the light generating panel 100 inside. FIG. 4 illustrates one example of the flexible lighting panel 100 that is partially inserted into the cavity 310 formed by the first and second flexible reflecting panels 302, 304.

Zipper 308 is just one example of a disconnectable connector. Other examples of a disconnectable connector include, touch-and-hold fasteners, hook-and-loop fasteners, Velcro, snaps, buttons, clips, string, straps, and various combinations thereof, etc.

The first flexible reflecting panel 302 has a first surface 314a and a second surface 314b, while the second flexible reflecting panel 304 has a third surface 314c, and a fourth surface 314d. As shown in FIG. 3, the first surface 314a and the third surface 314c are shown, while the second surface 314b and the fourth surface 314d are hidden on opposing sides of the first and second flexible reflecting panels 302, 304. Each of the first 314a, second 314b, third 314c, and fourth 314d surfaces possess a reflecting color hue that differs from one another. For example, the first surface 314a may possess a gold colored hue, the second surface 314b may possess a silver colored hue, the third surface 314c may possess a white colored hue, while the fourth surface 314d may possess a gray color hue. Nevertheless, it should be appreciated that the surfaces of the first and second flexible reflecting panels 302, 304 may have any desired color hue without deviating from the spirit and scope of the present disclosure.

When the light generating panel 100 is inserted into the cavity 310 formed by the first and second flexible reflecting panels 302, 304, either of the first 314a, second 314b, third 314c, or fourth 314d surface may be used as a reflector to bounce light towards a subject being photographed. To use the second 314b or fourth 314d surfaces in lieu of the first 314a or third 314c surfaces, the selectable color reflecting assembly 300 may be inverted (e.g., turned inside out) such that the second 314b and fourth 314d surfaces lie externally when the light generating panel 100 is inserted within the cavity 310. Using a particular example, when photographing a human subject, the selectable color reflecting assembly 300 may be configured such that the surface with a gold color hue is used to enhance warm tones on certain portions of the human subject's face.

The photographic light generating panel 100 as shown and described has an outer diameter of approximately 22.0 inches and a depth of approximately 1.5 inches in the open position, and an outer diameter of approximately 7.5 inches when in the coiled position. Such a size may be achieved when the front and rear support rings are coiled to make three generally concentric loops. Nevertheless, it should be appreciated that the photographic light generating panel 100 may be collapsed to any suitable storage size (e.g., coiled position) by forming more than three, or less than three generally concentric loops when in the collapsed position. Additionally, the photographic light generating panel 100 may have any suitable outer diameter and/or depth when in the open position.

Figure 5:
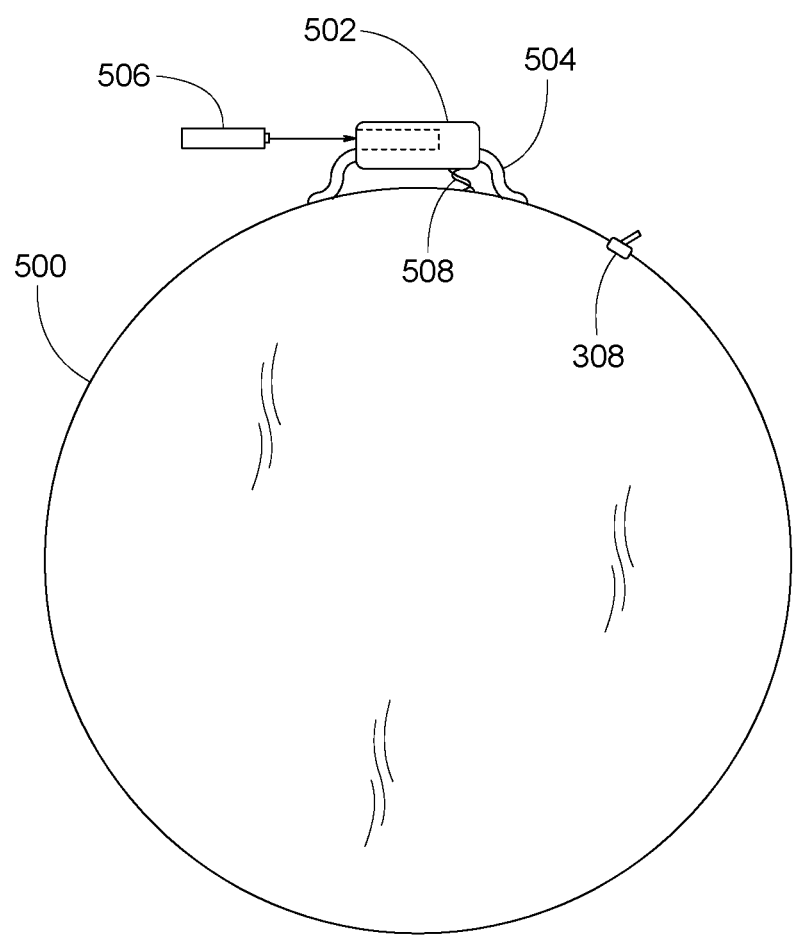
FIG. 5 is a front view of another example photographic light generating panel according to one embodiment of the present disclosure.

FIG. 5 illustrates another example photographic light generating panel 500 according to one embodiment of the present disclosure. The photographic light generating panel 500 includes front and rear support rings, a flexible rear panel, a flexible front panel, an annular covering fabric layer, and multiple LEDs that are similar in design and construction to the photographic light generating panel 100 of FIGS. 1A through 2B. Additionally, the photographic light generating panel 500 may also be configured to function with the selectable color reflecting assembly 300 as shown and described above with reference to FIGS. 3 and 4. The photographic light generating panel 500 differs, however, in that it includes a handle 502 that is attached to the rear support ring of the light generating panel 500. The handle 502 may be used for holding the photographic light generating panel 500 at any suitable position and orientation by the hand of the user. The handle 502 is secured to the rear support ring using a metal rod 504 that is attached to the rear support ring in any suitable manner, such as via weldment.

In one embodiment, the handle 502 may be configured with a cavity sized to accept a battery 506 inside. Power from the battery 506 may be provided to the LEDs via electrical wires 508 configured from the handle 502 to the light generating panel 500. Any suitable type of battery 506 may be used. For example, the battery 506 may include a lithium ion rechargeable battery pack. In some embodiments, the battery 506 may be removable while in other embodiments, the battery may be permanently or semi-permanently configured (e.g., non-removable) inside of the handle 506.

Figure 6A:
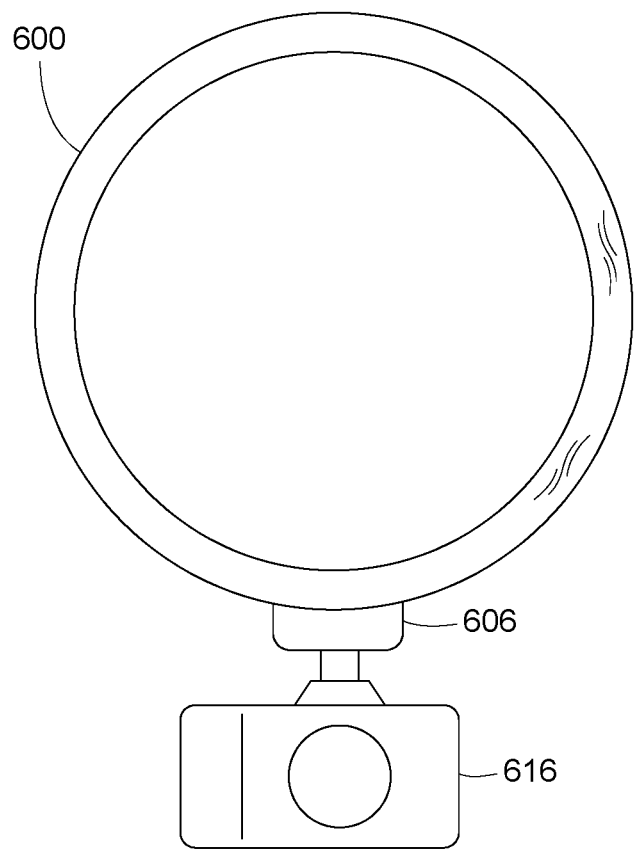
FIG. 6A is a front view of another example photographic light generating panel according to one embodiment of the present disclosure.
Figure 6B:
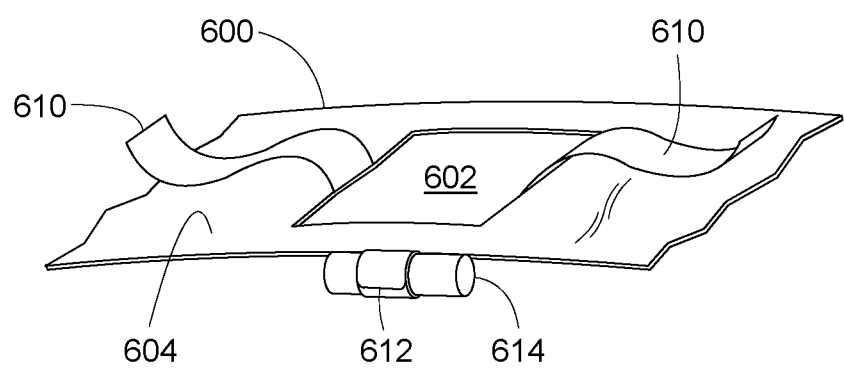
FIG. 6B is a front perspective view showing some details of the photographic light generating panel of FIG. 6A.

FIGS. 6A and 6B illustrate another example photographic light generating panel 600 according to one embodiment of the present disclosure. The photographic light generating panel 600 includes front and rear support rings, a flexible rear panel, a flexible front panel, an annular covering fabric layer, and multiple LEDs that are similar in design and construction to the photographic light generating panel 100 of FIGS. 1A through 2B. The photographic light generating panel 600 differs, however, in that it includes an aperture 602 configured in its annular covering fabric layer 604 for placement of at least a portion of a speedflash 606 inside the cavity formed by the photographic light generating panel 600. The speedflash 606 may include any type that can be mounted on the shoe of a camera 616.

The panel 600 may be used as an ancillary lighting source to the speedflash 606 for increasing or otherwise modifying light that is cast onto a subject, such as a person or thing being photographed. For example, the panel 600 may be used in conjunction with the speedflash 606 to provide a diffused lighting source for reducing sideways facing shadowing effects inherently caused via the use of speedflashes when used alone.

FIG. 6A illustrates the speedflash 606 configured in operative engagement on the panel 600, while FIG. 6B illustrates the panel 600 in which the speedflash 606 has been removed. Releasable attachment of the speedflash 606 to the panel 600 may be provided using one or more elongated straps 610 (releasable speedflash securement mechanism). The straps 610 may include two ends that extend outwardly from the panel 600 and have a hook-and-loop fastening material extending along each end. The straps 610 may also include a vinyl no-slip material layer configured on an opposing surface relative to the surface on which the hook-and-loop fastening material is configured such that, when the two ends are stretched around the periphery of the speedflash 606 and physically coupled together using their hook-and-loop fasteners, the vinyl no-slip material layer may hold the speedflash 606 in a relatively robust secure position on the panel 600.

The panel 600 may also include one or more elongated straps 612 for securement of a battery 614 that is used to power the LEDs in the panel 600. The straps 612 may be similar in design and construction as the straps 610 used to releasably secure the speedflash 606 to the panel 600.

The photographic light generating panel 600 may have an outer diameter of approximately 12.0 inches and a depth of approximately 2.5 inches within the open position, and an outer diameter of approximately 4.5 inches when in the coiled position. Such a size may be achieved when the front and rear support rings are coiled to make three generally concentric loops. Nevertheless, it should be appreciated that the photographic light generating panel 600 may have any suitable outer diameter and/or depth when in the open position.

Figure 7A:
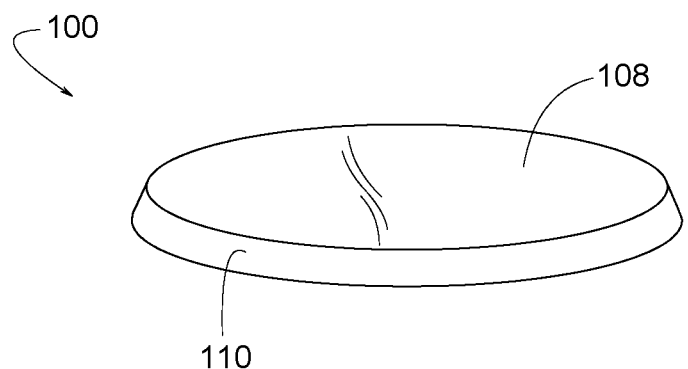
FIG. 7A is a perspective view of the example photographic light generating panel of FIGS. 1A-1C.
Figure 7B:
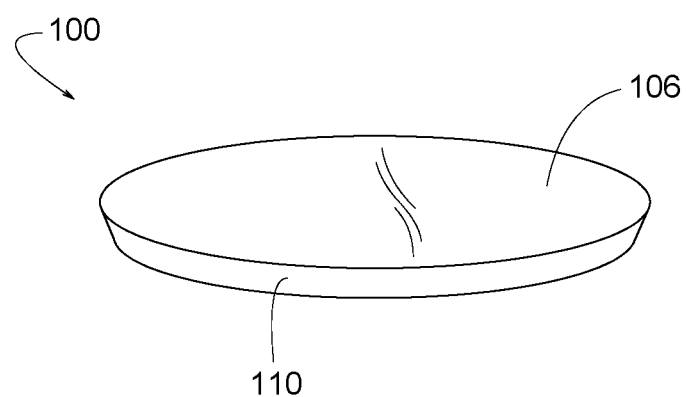
FIG. 7B is a another perspective view of the example photographic light generating panel of FIGS. 1A-1C.

FIGS. 7A and 7B are photographs depicting a rear perspective view and a front perspective view, respectively, of the example light generating panel 100 according to one embodiment of the present disclosure.

Figure 8:
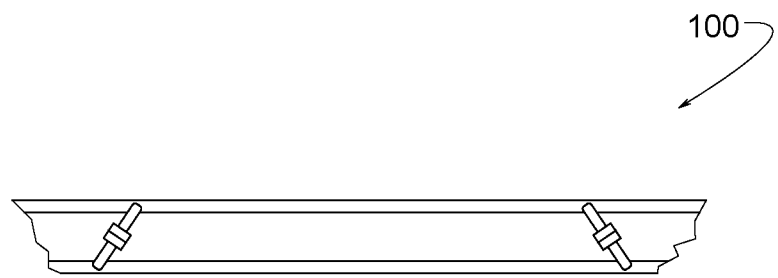
FIG. 8 is a partial side view of the example photographic light generating panel of FIGS. 1A-1C.

FIG. 8 is a photograph depicting an enlarged, partial, side view of the example light generating panel 100 according to one embodiment of the present disclosure.

Figure 9:
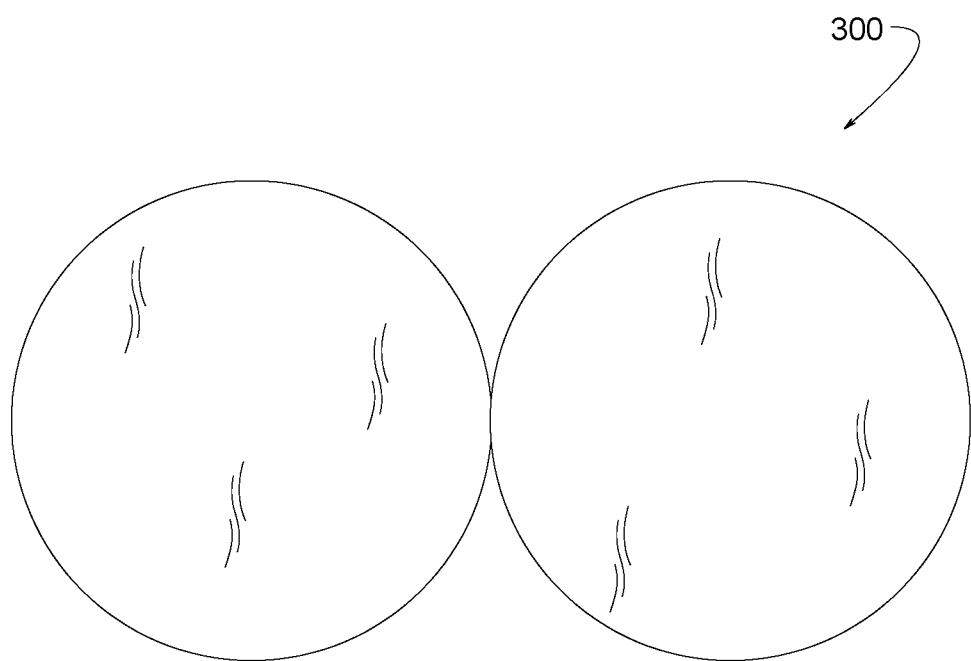
FIG. 9 is another top view similar to FIG. 3.

FIG. 9 is a photograph depicting a plan view of the example selectable color reflecting assembly 300 according to one embodiment of the present disclosure.

FIGS. 10A and 10B are photographs depicting various perspective views of the light generating panel 100 partially enclosed in a storage bag 1000 (a pouch) according to one embodiment of the present disclosure.

Figure 11A:
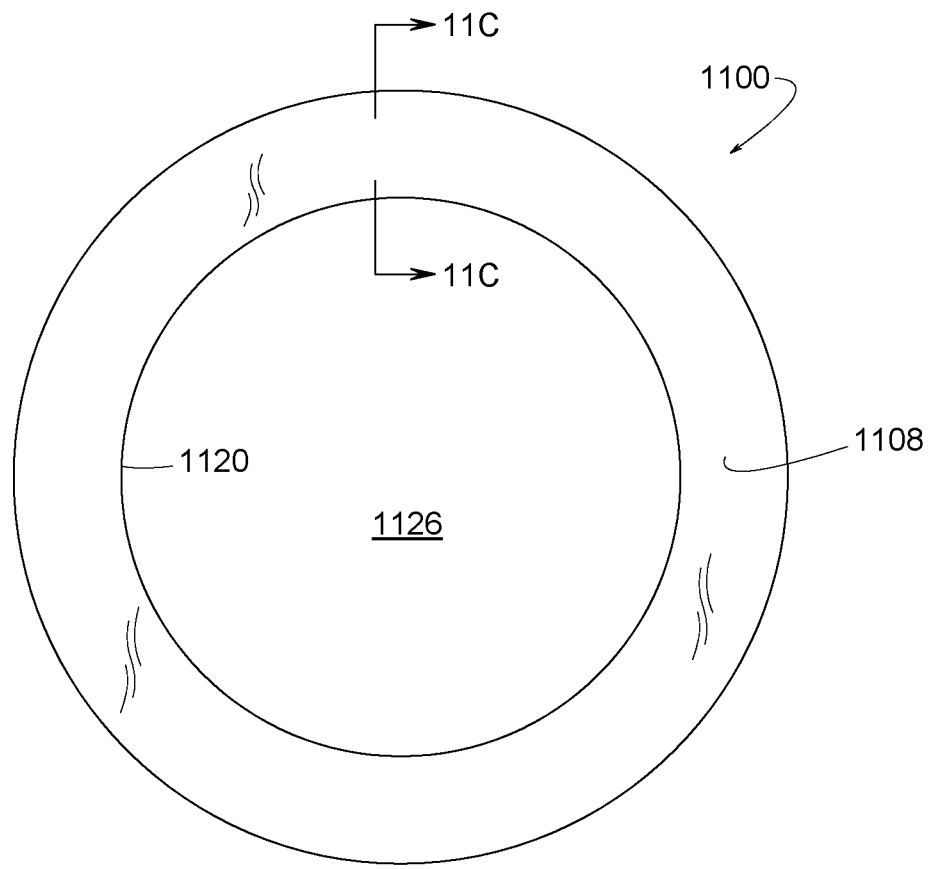
FIG. 11A is a front view of another example photographic light generating panel according to one embodiment of the present disclosure.
Figure 11B:
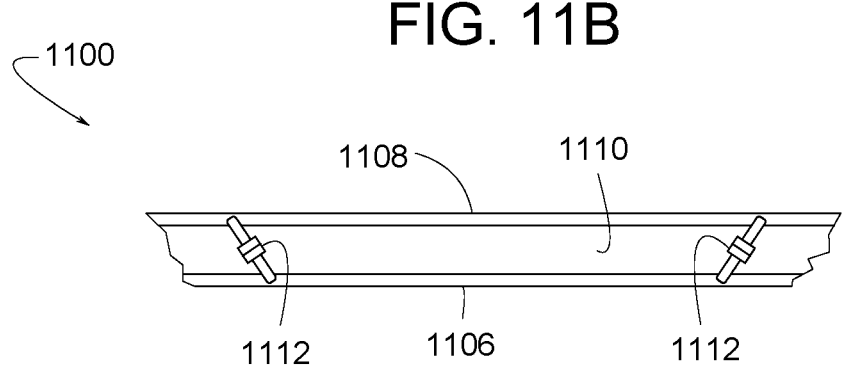
FIG. 11B is a partial side view of FIG. 11A.
Figure 11C:
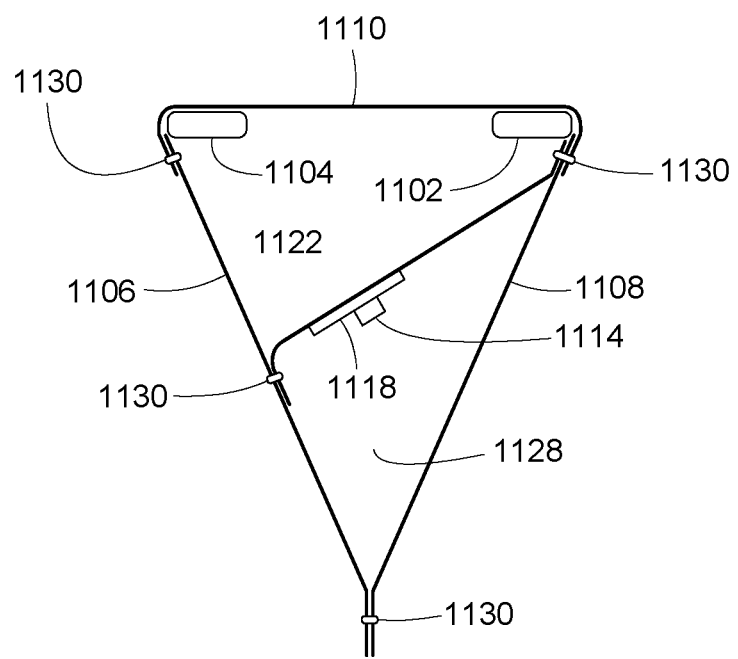
FIG. 11C is a cross-sectional view taken along line 11C-11C of FIG. 11A.

FIGS. 11A-11C illustrate another example photographic light generating panel 1100 according to one embodiment of the present disclosure. In particular, FIG. 11A illustrates a front view of the photographic light generating panel 1100, while FIG. 11B illustrates a side view of the photographic light generating panel 1100. Additionally, FIG. 11C illustrates a partial cut-away view of the light generating panel 1100 taken along the lines 11C-11C of FIG. 11A.

The photographic light generating panel 1100 includes front and rear support rings 1102 and 1104, a flexible rear panel 1106, a flexible front panel 1108, an annular covering fabric layer 1110, struts 1112, and multiple LEDs 1114 configured on an elongated circuit board 1118 that are similar in design and construction to the front and rear support rings 102 and 104, a flexible rear panel 106, a flexible front panel 108, annular covering fabric layer 110, struts 114, and multiple LEDs 112 fashioned on the circuit board 118 of the photographic light generating panel 100 of FIGS. 1A through 2B. The panel 1100 may be folded from an open (operational) position with a circular shape to a coiled position in which the front and rear support rings are each coiled into at least two or more loops in a similar manner to the panel 100.

The photographic light generating panel 1100 differs, however, in that the flexible rear panel 1106 and flexible front panel 1108 have concentric apertures 1126 fashioned therein to form a annular shape with an inner periphery 1120. Additionally, the elongated circuit board 1118 is not coupled to the annular covering fabric layer 110 as in the panel 100; rather it is coupled to an inner binding fabric layer 1122. Also, the front and rear support rings 1102 and 1104 have essentially the same diameter.

The panel 1100 configured with a central aperture 1126 may be particularly useful for, among other things, allowing a camera to view and take pictures or videos through the aperture 1126 while the light generated by the LEDs 1114 provides relatively good overall lighting for the subject being photographed.

When the panel 1100 is uncoiled to the open position as shown in FIGS. 11A and 11B, the inner binding fabric layer 1122 is stretched between the front support ring 1102 and the flexible rear panel 1106. Thus, the inner binding fabric layer 1122, flexible front panel 1108, and a portion of the flexible rear panel 1106 forms a cavity 1128 to reflect and diffract light generated by the LEDs 1114.

The flexible rear panel 1106, flexible front panel 1108, annular covering fabric layer 1110, and inner binding fabric layer 1122 may be coupled together in any suitable manner. In one embodiment, the flexible rear panel 1106, flexible front panel 1108, annular covering fabric layer 1110, and inner binding fabric layer 1122 may be coupled together using stitching 1130 as best shown in FIG. 11C.

Figure 12:
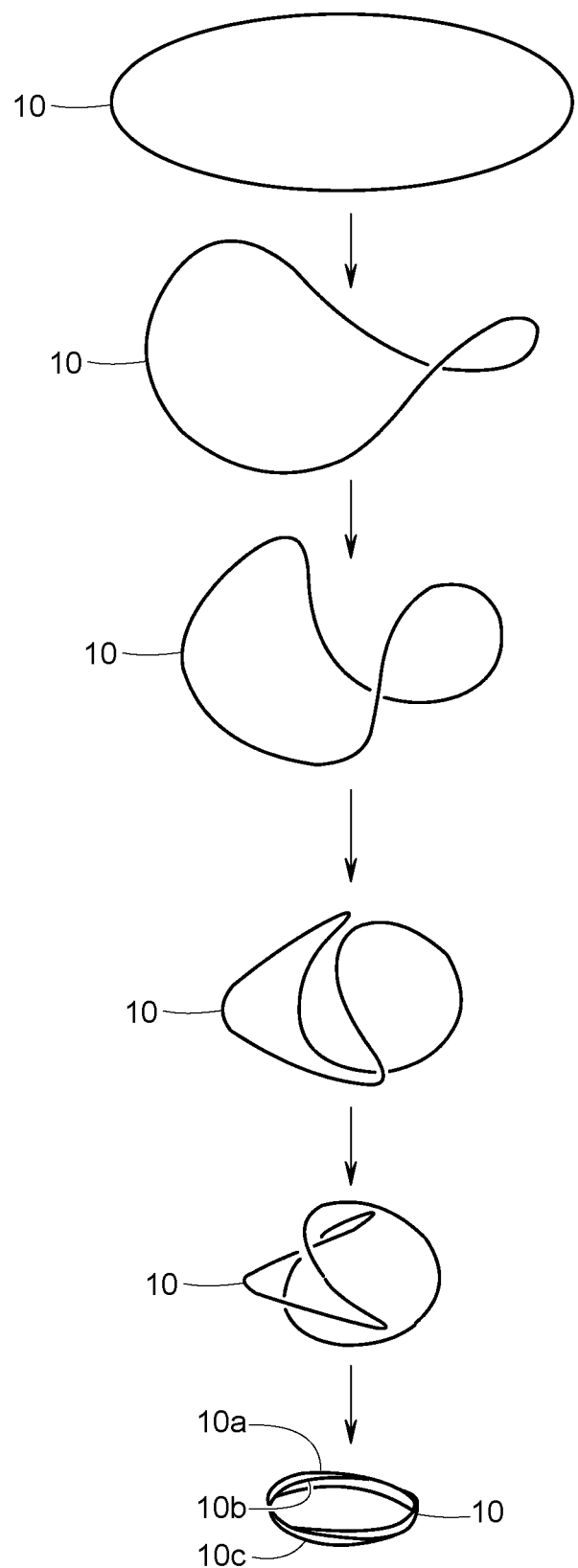
FIG. 12 is a schematic diagram showing a sequence of step illustrating how a single-loop support ring in an open position can be contorted into a more compact triple-loop coiled position.

FIG. 12 is a schematic diagram showing an example six-step progression of twisting and bending a single ring 10 into three loops 10a, 10b, and 10c. This same twisting and bending process can be applied to ring 102, ring 104, ring 302, ring 304, ring 1102, ring 1104, support ring 12 (FIG. 13), and support ring 14 (FIGS. 14 and 15).

Figure 13:
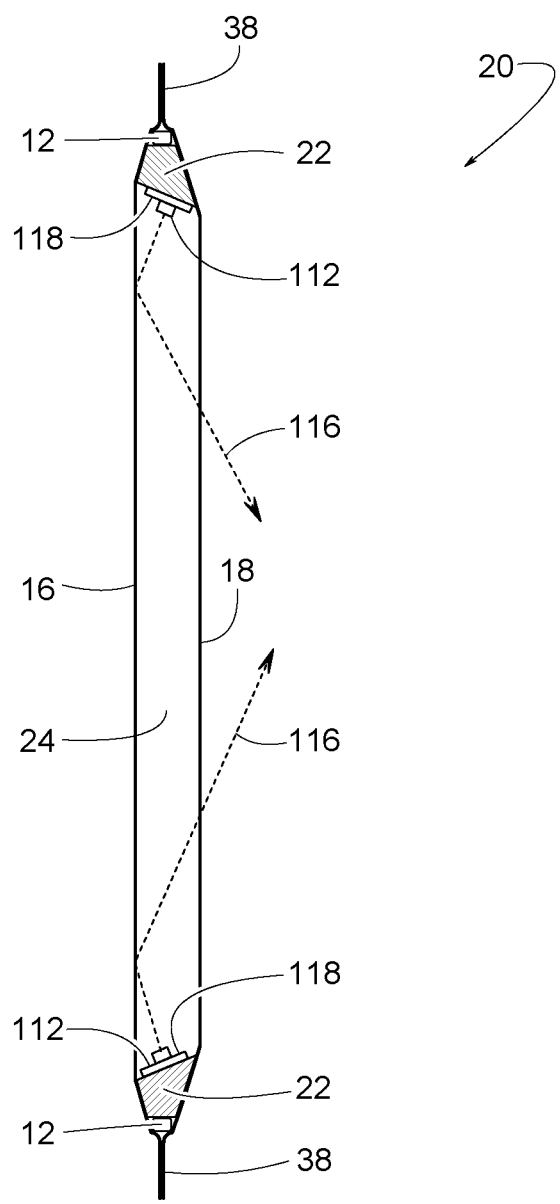
FIG. 13 is a cross-sectional side view similar to FIG. 2A but showing another example photographic light generating panel according to one embodiment of the present disclosure.

FIG. 13 shows an example photographic light generating panel 20 comprising a flexible front panel 18 and a flexible rear panel 16, which are similar to panels 106 and 108 respectively. In this example, panels 16 and 18 are thermally welding to each other along their outer perimeters (see thermally welded joint 38). Support ring 12 (similar to rings 102 and 104) help hold panel 20 taut in a radial direction. A resilient member 22 urges panels 16 and 18 apart to help create a cavity 24 between them. In some examples, resilient member 22 is in the form of a resiliently compressible foam ring.

FIGS. 14 and 15 show an example photographic light generating panel 30. In this example, lightly pressurized air 32 inflates panel 30 to hold panels 16 and 18 apart to create a cavity 34 through which beams 116 from LEDs 112 can pass. A valve 36 can be open (FIG. 14) or closed (FIG. 15) to selectively place cavity 32 in fluid communication with ambient air surrounding photographic light generating panel 30. In some examples, valve 36 is simply a tube that can be left open (FIG. 14) or pinched shut (FIG. 15). Pressurized air 32, in some examples, comes from a user manually blowing into valve 36.

It should be noted that FIG. 14 shows support ring 14 having an axial width 40 that is greater than its radial thickness 42. In some examples, width 40 is more than three times greater than thickness 42 to provide a support ring that is relatively thin. A relatively thin support ring (e.g., a band) is under less strain than thicker rings (e.g., a wire or tube) when the ring is in a triple coiled position. So, a relatively thin support ring made of hardened spring steel holds its shape well when in the open position yet is easy to manually hold in its coiled position. In some examples, a relatively thin support ring might be under higher strain when in a transitional shape between its open position and coiled position.

Thus, in some examples, the support ring might be considered as somewhat of a bi-stable structure, i.e., perhaps more stable and less stressed when in the shape shown in the uppermost and lowermost figures of FIG. 12, and less stable and more strained when in the shapes shown in the four middle figures of FIG. 12. The concept of width 40 being more than three times greater than thickness 42 can be applied to all of the support rings disclosed herein, including support rings 10, 12, 14, 102, 104, 1102, and 1104.

Figure 16:
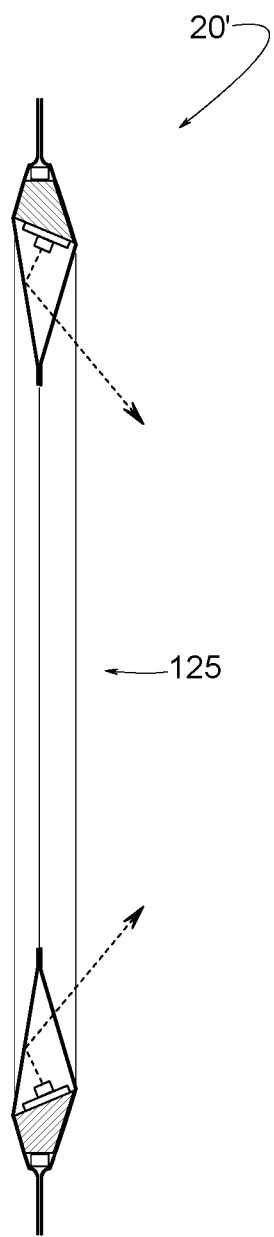
FIG. 16 is a cross-sectional side view showing a donut version (with a central aperture) of the photographic light generating panel of FIG. 13.

FIG. 16 shows an example photographic light generating panel 20', which is a donut version photographic light generating panel 20 of FIG. 13. Photographic light generating panel 20' has a central aperture 125.

Figure 17:
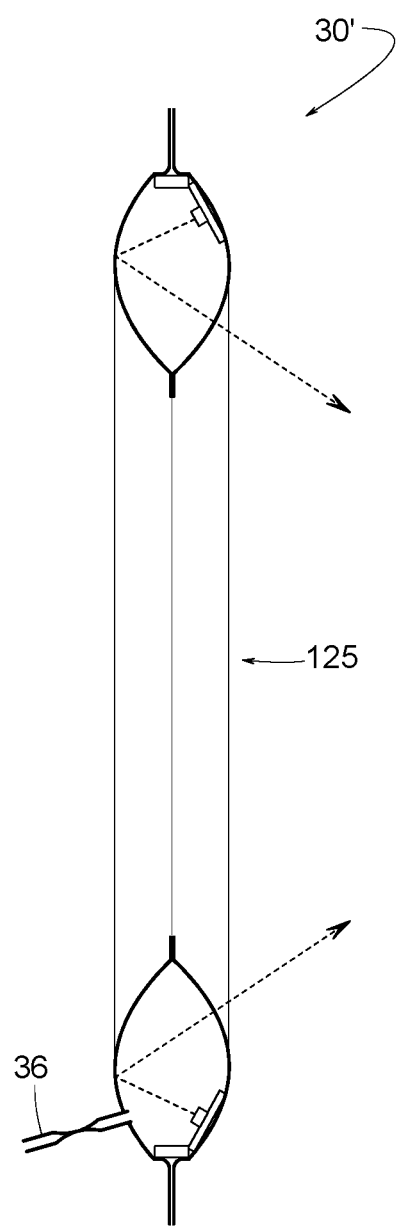
FIG. 17 is a cross-sectional side view showing a donut version (with a central aperture) of the photographic light generating panel of FIG. 15.

FIG. 17 shows an example photographic light generating panel 30', which is a donut version photographic light generating panel 30 of FIGS. 14 and 15. Photographic light generating panel 30' has a central aperture 125.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A photographic light generating panel comprising:
   a front support ring and a rear support ring that are selectively foldable from an open position with a circular shape to a coiled position in which the front and rear support rings are each coiled into at least two loops;
   a flexible front panel having a first outer edge that is coupled to and extending along a first periphery of the front support ring, the flexible front panel comprising a translucent material;
   a flexible rear panel having a second outer edge that is coupled to and extending along a second periphery of the rear support ring, the flexible rear panel comprising a reflective inner surface;
   an annular covering fabric layer extending between the first periphery of the front support ring and the second periphery of the rear support ring; and
   a plurality of LEDs coupled to and extending along an inner periphery of the annular covering fabric layer; the flexible rear panel, the flexible front panel, and the annular covering fabric layer form a cavity for receiving a plurality of light beams generated by the plurality of LEDs when the front support ring and the rear support ring are in the open position, wherein the plurality of light beams are reflected from the reflective inner surface of the flexible rear panel and emitted out through the translucent material of the flexible front panel.

2. The photographic light generating panel of claim 1, wherein the first support ring and the second support ring differ in diameter so the first support ring and the second support ring can fit in a nested arrangement within one another when the front support ring and the rear support ring are in the coiled position.

3. The photographic light generating panel of claim 2, wherein the annular covering fabric layer is oriented at an oblique angle when the front support ring and the rear support ring are in the open position so that the plurality of light beams generated by the plurality of LEDs are directed mostly toward the reflective surface of the flexible rear panel.

4. The photographic light generating panel of claim 1, wherein the plurality of LEDs are configured in an evenly spaced linear array along a flexible circuit board having a plurality of conductive traces for providing electrical energy to the plurality of LEDs, the plurality of conductive traces being configured in a serpentine pattern to optimize flexure of the flexible circuit board.

5. The photographic light generating panel of claim 1, further comprising a selectable color reflecting assembly, the selectable color reflecting assembly comprising:
   a first flexible reflecting panel having a first surface and a second surface;
   a second flexible reflecting panel having a third surface and a fourth surface, wherein the first, second, third, and fourth surfaces possess a reflecting color hue that differs from one another; and
   a zipper configured to selectively couple a portion of an outer periphery of the first flexible reflecting panel and the second flexible reflecting panel to one another to form a pocket for enclosing the light generating panel, wherein the pocket can be selectively inverted such that when enclosing the light generating panel, at least one of the first surface, the second surface, the third surface, and the fourth surface provides a reflective surface for photographic use.

6. The photographic light generating panel of claim 1, wherein the photographic light generating panel is useable with a speedflash, and the photographic light generating panel further comprising:
   an aperture defined by the annular covering fabric layer for selective placement of the speedflash at least partially within the cavity; and
   a releasable speedflash securement mechanism at the aperture for selectively securing the speedflash to the photographic light generating panel.

7. The photographic light generating panel of claim 1, further comprising a handle coupled to at least one of the front support ring and the rear support ring.

8. The photographic light generating panel of claim 7, wherein the handle comprises a battery storage compartment for storing at least one battery for powering the plurality of LEDs.

9. The photographic light generating panel of claim 1, wherein each of the flexible front panel and the flexible rear panel define a central aperture such that the photographic light generating panel has an annular shape.

10. A photographic light generating panel comprising:
    a support ring selectively configurable to an open position and a coiled position, the support ring having a substantially circular shape when the support ring is in the open position, the support ring being contorted into three loops when the support ring is in the coiled position;
    a flexible rear panel supported by the support ring, the flexible rear panel being substantially circular to correspond to the substantially circular shape of the support ring when the support ring is in the open position, the flexible rear panel having a reflective inner surface;
    a flexible front panel supported by the support ring, the flexible front panel being substantially circular to correspond to the substantially circular shape of the support ring when the support ring is in the open position, the flexible front panel including a translucent material that is less reflective than the reflective inner surface of the flexible rear panel, the flexible front panel and the flexible rear panel defining a cavity therebetween; and
    a plurality of LEDs supported by at least one of the support ring, the flexible rear panel, and the flexible front panel; the plurality of LEDs being situated to emit a plurality of light beams into the cavity such that the plurality of light beams is reflected from the reflective inner surface of the flexible rear panel and emitted out through the translucent material of the flexible front panel when the support ring is in the open position.

11. The photographic light generating panel of claim 10, further comprising a resilient member extending from the flexible front panel to the flexible rear panel such that the resilient member urges the flexible front panel and the flexible rear panel apart from each other to help create the cavity therebetween.

12. The photographic light generating panel of claim 11, wherein the resilient member includes a resiliently compressible foam member interposed between the flexible rear panel and the flexible front panel.

13. The photographic light generating panel of claim 12, wherein the resiliently compressible foam member is at least a partial ring extending circumferentially along the support ring.

14. The photographic light generating panel of claim 10, further comprising:
   a first flexible reflecting panel having a first surface and a second surface; and
   a second flexible reflecting panel having a third surface and a fourth surface, wherein the first, second, third, and fourth surfaces possess a reflecting color hue that differs from one another; the first flexible reflecting panel being connected to the second reflecting panel to create a pocket of sufficient size to contain the flexible front panel and the flexible rear panel when the support ring is in the open position.

15. The photographic light generating panel of claim 14, wherein the pocket includes a disconnectable connector between the first flexible reflecting panel and the second flexible reflecting panel.

16. The photographic light generating panel of claim 15, wherein the disconnectable connector is a zipper.

17. The photographic light generating panel of claim 10, further comprising a pouch sufficiently large to contain the support ring, the flexible rear panel, the flexible front panel, and the plurality of LEDs when the support ring is in the closed position, the pouch being too small to contain the support ring, the flexible rear panel, the flexible front panel and the plurality of LEDs when the support ring is in the open position.

18. The photographic light generating panel of claim 10, wherein each of the flexible front panel and the flexible rear panel define a central aperture such that the photographic light generating panel has an annular shape.

19. The photographic light generating panel of claim 10, further comprising a valve to selectively place the cavity in fluid communication with ambient air surrounding the photographic light generating panel.

20. A photographic light generating panel comprising:
   a support ring selectively configurable to an open position and a coiled position, the support ring having a substantially circular shape when the support ring is in the open position, the support ring being contorted into three loops when the support ring is in the open position;
   a flexible rear panel supported by the support ring, the flexible rear panel being substantially circular to correspond to the substantially circular shape of the support ring when the support ring is in the open position, the flexible rear panel having a reflective inner surface;
   a flexible front panel supported by the support ring, the flexible front panel being substantially circular to correspond to the substantially circular shape of the support ring when the support ring is in the open position, the flexible front panel including a translucent material, the flexible front panel and the flexible rear panel defining a cavity therebetween when the support ring is in the open position;
   a plurality of LEDs supported by at least one of the support ring, the flexible rear panel, and the flexible front panel; the plurality of LEDs being situated to emit a plurality of light beams into the cavity such that the plurality of light beams is reflected from the reflective inner surface of the flexible rear panel and emitted out through the translucent material of the flexible front panel when the support ring is in the open position;
   a first flexible reflecting panel having a first surface and a second surface;
   a second flexible reflecting panel having a third surface and a fourth surface, the first flexible reflecting panel being connected to the second reflecting panel to create a pocket of sufficient size to contain the support ring, the flexible front panel, the flexible rear panel, and the plurality of LEDs when the support ring is in the open position; and
   a pouch sufficiently large to contain the support ring, the flexible rear panel, the flexible front panel, and the plurality of LEDs when the support ring is in the closed position, the pouch being too small to contain the support ring, the flexible rear panel, the flexible front panel and the plurality of LEDs when the support ring is in the open position.

* * * * *